UNITED STATES PATENT OFFICE.

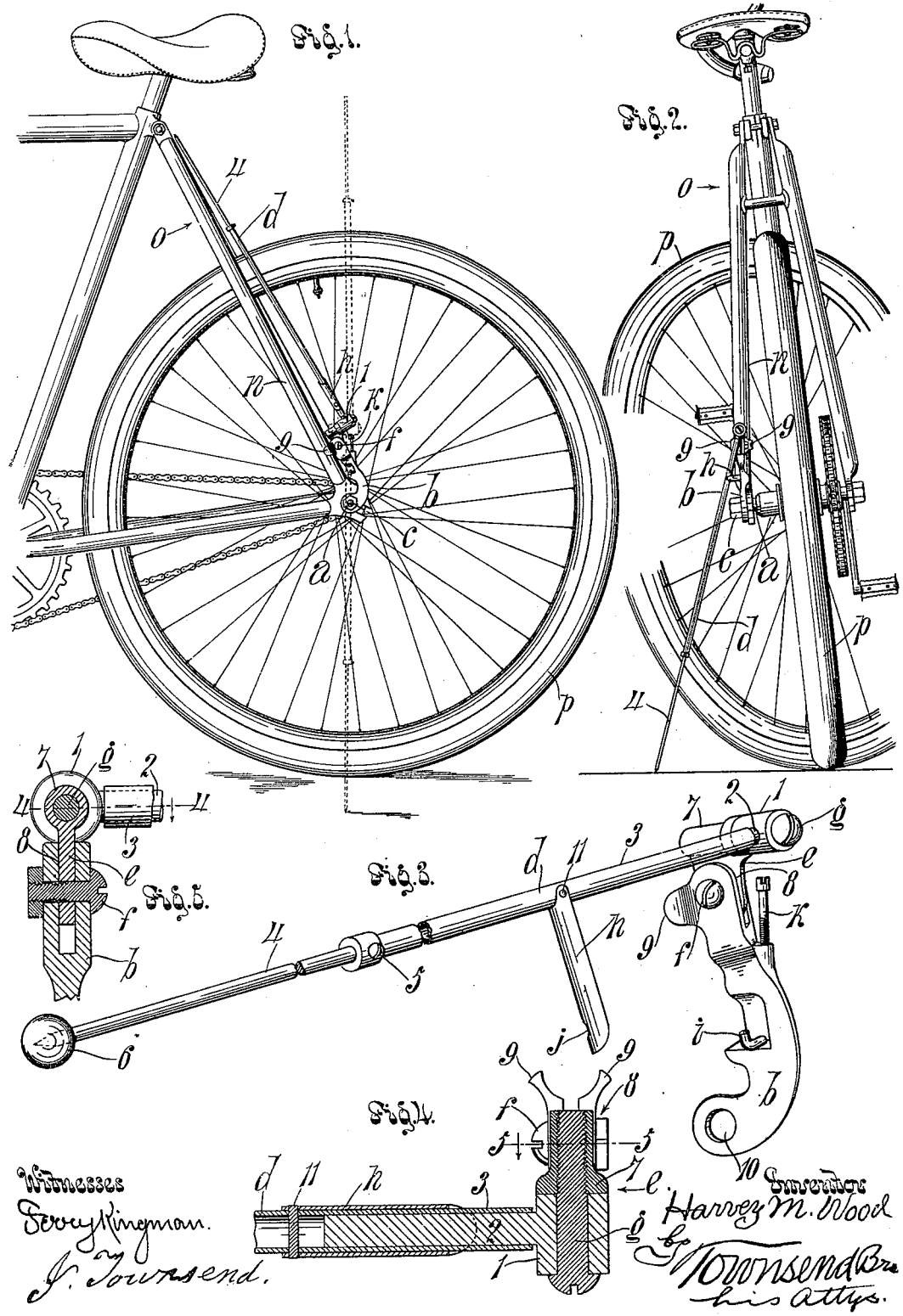

HARVEY M. WOOD, OF DENVER, COLORADO.

BICYCLE-SUPPORT.

SPECIFICATION forming part of Letters Patent No. 666,249, dated January 15, 1901.

Application filed January 22, 1900. Serial No. 2,378. (No model.)

*To all whom it may concern:*

Be it known that I, HARVEY M. WOOD, a citizen of the United States, residing at Denver, in the county of Arapahoe and State of Colorado, have invented a new and useful Bicycle-Support, of which the following is a specification.

An object of this invention is to provide improvements in supports for holding a bicycle upright on a floor, pavement, earth, or other supporting-surface.

In my invention I make provision for avoiding the use of any arms permanently projecting from the side of the bicycle-frame and have applied to the supporting-leg a pivoted tie which folds against the leg and can be brought into position to catch upon a small hook carried by the bracket.

I employ a bracket attached to the axle of the bicycle and an arm adjustably attached to the bracket. The attachment is preferably applied to the rear axle of the bicycle and extends outward therefrom and is fastened to said axle and to the frame by the nut which holds the axle in the frame, for the reason that when so applied it forms a ready and stable support for the bicycle when brought down into position therefor and when not in use may be readily folded up behind the rear fork of the frame, thus being entirely out of the way of the rider.

The accompanying drawings illustrate my invention.

Figure 1 is a side elevation of my newly-invented bicycle-support in its preferred form and mode of application to a bicycle, a portion of which is shown. The support is shown in its folded position out of use. Dotted lines indicate the supporting-arm in position to support the wheel. An intermediate position of the arm is also indicated in dotted lines. Fig. 2 is a rear elevation of a bicycle provided with my invention. In this view the supporting-arm is shown in position to support the bicycle. The front wheel is also shown turned into the position it is usually thrown into when the bicycle is thus supported. Fig. 3 is a perspective detail of the attachment for carrying out my invention. Fig. 4 is a plan view. The hinged member and the arm are shown in section on line 4 4, Fig. 5, along the axis of the pivot which pivots them together. Fig. 5 is a section on line 5 5, Fig. 4, looking toward the arm.

$a$ indicates the rear axle of the bicycle.

$b$ indicates a bracket attached to the axle by the axle-nut $c$, cleft at the top, and thus provided with two clamping and pivoting arms $b'\ b''$.

$d$ indicates an arm adjustably attached to the bracket $b$ through the medium of a hinge member $e$, hinged to the bracket by a pivoting clamp-screw $f$. The arm $d$ is pivoted to the hinge member $e$ by the pivot $g$. Preferably the arm $d$ is arranged to rotate on its axis and is provided with a tie $h$, pivoted to the arm $d$ and adapted to catch upon the bracket $b$, a hook $i$ being provided on the bracket for this purpose.

$j$ indicates a catch or perforation in the tie $h$ to receive the hook $i$.

$k$ indicates an adjusting-stop screwed into the bracket for stopping the hinge member $e$.

The arm $d$ includes a leg portion 3 4 and a journal box or eye 1, provided with a laterally-projecting stem 2, onto which a tube 3 of the leg portion telescopes.

4 indicates a rod telescoping in the tube 3 and adjustably secured to said tube by a clamp-screw 5.

6 indicates a ball of rubber or other suitable material, which may be fastened on the end of the rod 4 to prevent the end of the rod from sinking into the earth. The end of the rod is preferably pointed, as indicated in Figs. 1 and 2 and by dotted lines in Fig. 3. The ball may be omitted when desired. The pivots $g$ and $f$ are preferably screw-threaded. The screw-threaded clamping and pivoting pin $f$ is inserted in holes $e'$ and $b'''$ in the hinge member $e$ and the arms $b'\ b''$ and is screwed to tightly clamp the hinge member in the cleft 8, allowing said hinge member to move when considerable force is applied, but ordinarily holding the hinge member stationary. The pivot $g$ extends through the journal-piece 1 and screws into a socket 7 in the hinge member $e$, preferably at right angles to the pin $f$, which fastens the member $e$ in a cleft 8 in the upper end of the bracket $b$.

9 indicates lugs at the upper end of the bracket $b$ to partially embrace one of the rear forks $n$ of the frame $o$ of the bicycle.

10 indicates a hole in the lower end of the bracket b, through which the axle a of the bicycle will be inserted for fastening the bracket to the frame. The holes b''' and e' extend parallel with the hole 10, which fits upon the axle, and the hole to receive the screw-pivot g in the head 7 of the hinge member and extends in a plane at right angles to the hole e'.

The tube 3 fits friction-tight upon the stem 2, and by screwing the screws f and g, which form the pivots by which the arm is adjustably secured to the bracket, the joints may be tightened, so that the parts will not be displaced without a considerable amount of force, thus to be held in position when folded up.

In practical use the supporting-arm will ordinarily be in the position indicated in solid lines in Fig. 1; but when the rider dismounts and wishes to leave the bicycle in standing position he will throw the arm d back first into the position indicated in dotted lines above the axle of the wheel in Fig. 1. Then the arm will be drawn forward into the position indicated by the dotted lines below the axle in said view and the point will be allowed to rest upon the supporting-surface, as indicated in Fig. 2. In case the supporting-surface is yielding enough to prevent any slipping of the point of the arm the wheel will be readily supported by the arm; but in the case of smooth floors the arm is liable to be spread apart from the wheel p, thus allowing the bicycle to fall. In order to avoid this tendency, the tie h will be hooked to the bracket by hooking the catch j over the hook i.

The tie h is preferably hollowed to fit the tube 3, to which it is pivoted by the pivot 11.

When the rider wishes to mount, he will release the tie h from the bracket and will throw it up into position against the arm d, as indicated in Fig. 1, and will then bring the arm d into the position indicated in Fig. 1.

The purpose of the set-screw k is to hold the axis of the pivot g at the appropriate inclination, so that when the arm d is brought down it will be in the appropriate position for supporting the bicycle and to allow the catch j to catch the hook i.

The portions 3 and 4 of the arm d are made rotatable on the axis of the arm, so that when the tie h is brought into position to hook in the hook i the catch j can be brought down to receive the hook. If it does not fit upon the hook, the arm will be slightly rotated on the pin 2, thus to allow the catch to catch on the hook. This adjustment is designed to adapt the appliance to fit on different bicycles and will not be called into use after the appliance has been adjusted.

When the support is in use, as shown, with the bracket fastened to the rear axle, the arm d forms one side of a substantially triangular figure which extends in a vertical plane beneath the axle, so that the pilot-wheel p is not liable to circle around the rear wheel or its support.

What I claim, and desire to secure by Letters Patent of the United States, is—

1. A bicycle-support comprising a bracket to be fastened to the bicycle-frame and provided with two arms perforated to receive a pivoting clamp-screw; a hinge member provided with a perforated tongue inserted between said arms, and also provided with a head having a hole extending in a plane at right angles to the perforation of the tongue; a pivoting clamp-screw through said arms and tongue to pivot and clamp them together; a journal-box or eye provided with a laterally-projecting stem; a pivot screwed through the eye and held by said head; and a leg socketed on the said stem.

2. A bicycle-support comprising a bracket provided at one end with a hole to fit upon the rear axle of a bicycle and provided at the top with a cleft and thereby formed into two arms which are perforated with a hole extending parallel with the said axle-hole; a hinge member provided at one end with a tongue fitted between the arms and perforated to correspond with the perforations of the said arms, and provided with a head which has a hole extending in a plane which is at right angles to the plane in which the perforation of the tongue extends; a pivoting clamp-screw in the perforations of the arms and tongue to clamp the tongue in the cleft; an arm provided with an eye; and a screw in the eye and in the head of the hinge member to pivotally hold said arm upon said hinge member.

3. A bicycle-support comprising a bracket provided at its lower end with a hole to fit upon the rear axle of the bicycle and perforated at its upper end; a hinge-piece provided with a head having a hole therein and provided with a perforated tongue; a pin in the perforations of the tongue and bracket to pivot the tongue and bracket together; an arm provided with an eye; a pivot through the eye and fastened in the head of the hinge member; and a set-screw screwed into the bracket and extending up into the path of the eye.

4. A bicycle-support comprising a bracket provided at its lower end with a hole to fit upon the rear axle of the bicycle and provided at its upper end with a cleft and thereby formed in two arms having forward extensions to clasp the rear fork of the bicycle; a hinge member having a tongue pivoted between the said arms; an arm provided with an eye; and a pivot inserted through the eye and screwed into the head of the hinge member.

5. In a bicycle, the combination of a bracket fastened to the bicycle-frame; a member hinged to the bracket; an arm pivoted to the hinged member; and a tie pivoted to the arm to fold against said arm and adapted to catch upon the bracket.

6. In a bicycle, the combination of a bracket fastened to the frame of the bicycle and provided with a hook; a member hinged to the bracket; an arm pivoted to the hinged member and arranged to rotate on its axis; and a tie pivoted to said arm to swing to and from the body of the arm and adapted to catch upon the hook.

7. The combination with a bicycle; of a bracket fastened to the bicycle-frame and provided between its ends with a hook; a member hinged to the bracket; a rotatable arm pivoted to the hinged member; and a tie pivoted to the rotatable arm and provided with a catch to catch upon the hook.

In testimony whereof I have signed my name to this specification, in the presence of two subscribing witnesses, at Los Angeles, California, this 16th day of January, 1900.

H. M. WOOD.

Witnesses:
   JAMES R. TOWNSEND,
   FRANCIS M. TOWNSEND.